(12) United States Patent
Bhandari et al.

(10) Patent No.: US 12,021,250 B2
(45) Date of Patent: Jun. 25, 2024

(54) FLANGE FASTENING AND SEALING ARRANGEMENT FOR EXTERIOR THERMAL PROTECTION OF A BATTERY PACK

(71) Applicant: GM GLOBAL TECHNOLOGY OPERATIONS LLC, Detroit, MI (US)

(72) Inventors: Abhay R. Bhandari, Troy, MI (US); Carl E. Fonville, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 17/684,931

(22) Filed: Mar. 2, 2022

(65) Prior Publication Data

US 2023/0282916 A1    Sep. 7, 2023

(51) Int. Cl.
*H01M 50/24* (2021.01)
*H01M 10/658* (2014.01)
*H01M 50/244* (2021.01)
*H01M 50/273* (2021.01)

(52) U.S. Cl.
CPC ......... *H01M 50/24* (2021.01); *H01M 10/658* (2015.04); *H01M 50/244* (2021.01); *H01M 50/273* (2021.01)

(58) Field of Classification Search
CPC ........... H01M 50/271; H01M 2220/20; H01M 10/613; H01M 50/24; H01M 10/658; H01M 50/244; H01M 50/207; H01M 50/00; H01M 50/10; H01M 50/102; H01M 50/103; H01M 50/262; H01M 50/249; H05K 5/04; H05K 5/0217
See application file for complete search history.

(56) References Cited

U.S. PATENT DOCUMENTS

| | | | | |
|---|---|---|---|---|
| 9,761,851 | B2 * | 9/2017 | Onodera | H01M 50/3425 |
| 2017/0018745 | A1 * | 1/2017 | Nakamori | H01M 50/186 |
| 2017/0267089 | A1 * | 9/2017 | Sugizaki | H01M 50/209 |
| 2018/0361874 | A1 * | 12/2018 | Kobayashi | H01M 50/227 |
| 2019/0081297 | A1 * | 3/2019 | Nakamori | H01M 50/124 |
| 2023/0187749 | A1 * | 6/2023 | Krüger | H01M 50/249 |
| | | | | 429/185 |

* cited by examiner

*Primary Examiner* — Adam B Dravininkas
(74) *Attorney, Agent, or Firm* — Quinn IP Law

(57) ABSTRACT

A fastening arrangement includes a tray having an outwardly extending tray flange with a first hole therein, a cover having a generally U-shaped portion and a cover flange extending outward therefrom with a second hole therein. The cover is disposed atop the tray with the generally U-shaped portion disposed in contact with the tray flange and the cover flange disposed a predetermined height above the tray flange with the first and second holes aligned with each other. A spacer having a third hole therethrough is disposed between the tray flange and the cover flange with the third hole aligned with the first and second holes. A fastener arrangement has a shaft extending through the first, second and third holes, a head formed on a first shaft end, a threaded portion on a second shaft end, and a nut engaged with the threaded portion.

17 Claims, 3 Drawing Sheets

FLANGE FASTENING AND SEALING ARRANGEMENT FOR EXTERIOR THERMAL PROTECTION OF A BATTERY PACK

INTRODUCTION

This disclosure relates to flange fastening and sealing arrangements for exterior thermal protection of batteries and battery packs.

Batteries and battery packs, such as may be used to power electric or hybrid automotive vehicles, are often housed in an enclosure or housing. Such a housing may include a relatively deep tray (into which the batteries or batteries packs are placed) and a relatively shallow cover on top of the tray. Customarily, the outer periphery of the tray and cover include respective flanges that mate with each other when the cover is placed atop the tray, with the flanges being shaped such that an elastomeric seal may be placed between the flanges, and with the flanges being fastened together with bolts and nuts.

SUMMARY

According to one embodiment, a fastening arrangement includes a tray, a cover, a spacer and a fastener arrangement. The tray has a floor with a floor periphery thereabout, a tray wall extending upward from the floor periphery, and a tray flange extending outward from an upper portion of the tray wall with a first hole defined in the tray flange. The cover has a ceiling with a ceiling periphery thereabout, a cover wall extending downward from the ceiling periphery and having a lower portion, a generally U-shaped portion extending at a first end thereof from the lower portion and having a second end opposite the first end and a middle portion between the first and second ends, and a cover flange extending outward from the second end of the generally U-shaped portion with a second hole defined in the cover flange. The cover is disposed atop the tray with the middle portion of the generally U-shaped portion disposed in contact with the tray flange such that the tray and cover enclose an interior, and the cover flange is disposed a predetermined height above the tray flange with the first and second holes aligned with each other. The spacer has a third hole therethrough and is disposed between the tray flange and the cover flange with the third hole aligned with the first and second holes. The fastener arrangement has a shaft extending through the first, second and third holes and has opposed first and second shaft ends. A head is formed on the first shaft end and a threaded portion is formed on the second shaft end, and a nut is engaged with the threaded portion.

In this embodiment, the fastener arrangement may be configured to constrain a height between the cover flange and the tray flange so as to not exceed the predetermined height. The head may include a first clamping surface seated directly or indirectly against a top surface of the cover flange, and the nut may include a second clamping surface seated directly or indirectly against a bottom surface of the tray flange.

The fastening arrangement may further include an elastomeric seal disposed between the cover flange and the tray flange and between the generally U-shaped portion and the spacer. The elastomeric seal may be adhered to both the cover flange and the tray flange, and may be spaced apart from the spacer. The elastomeric seal may form a first closed loop around the interior, and the generally U-shaped portion may form a second closed loop around the interior. The generally U-shaped portion being disposed in contact with the tray flange may provide a barrier which thermally isolates the elastomeric seal from the interior.

The spacer may include a tubular body portion and a washer-like portion extending outward from an upper end of the tubular body portion. In this configuration, the tubular body portion may extend through the first hole and the washer-like portion may be sandwiched between a top surface of the cover flange and an underside surface of the head. The spacer may also be disposed so as to maintain the predetermined height between the cover flange and the tray flange.

According to another embodiment, a flange fastening and sealing arrangement includes: (i) a tray having a generally flat floor with a floor periphery thereabout, a tray wall extending upward from the floor periphery, and a tray flange extending outward from an upper portion of the tray wall with a first hole defined in the tray flange; (ii) a cover having a generally flat ceiling with a ceiling periphery thereabout, a cover wall extending downward from the ceiling periphery and having a lower portion, a generally U-shaped portion extending at a first end thereof from the lower portion and having a second end opposite the first end and a middle portion between the first and second ends, and a cover flange extending outward from the second end of the generally U-shaped portion with a second hole defined in the cover flange, wherein the cover is disposed atop the tray with the middle portion of the generally U-shaped portion disposed in contact with the tray flange such that the tray and cover enclose an interior, and wherein the tray flange and the cover flange are disposed such that the first and second holes are aligned with each other; (iii) a spacer having a third hole therethrough, wherein the spacer has a predetermined height and is disposed between the tray flange and the cover flange with the third hole aligned with the first and second holes; (iv) an elastomeric seal disposed between the cover flange and the tray flange and between the generally U-shaped portion and the spacer; and (v) a fastener arrangement including a bolt having a shaft extending through the first, second and third holes, a head formed on a first shaft end, a threaded portion on a second shaft end, and a nut engaged with the threaded portion.

In this embodiment, the elastomeric seal may be adhered to both the cover flange and the tray flange and may be spaced apart from the spacer. The elastomeric seal may form a first closed loop around the interior and the generally U-shaped portion may form a second closed loop around the interior. In this arrangement, the generally U-shaped portion being disposed in contact with the tray flange may provide a barrier which thermally isolates the elastomeric seal from the interior. Additionally, the spacer may include a tubular body portion and a washer-like portion extending outward from an upper end of the tubular body portion, wherein the tubular body portion extends through the first hole and the washer-like portion is sandwiched between a top surface of the cover flange and an underside surface of the head.

According to yet another embodiment, a housing for thermal protection of a battery pack includes a tray, a cover, an elastomeric seal, a spacer and a fastener arrangement. The tray has a floor with a floor periphery thereabout, a tray wall extending upward from the floor periphery, and a tray flange extending outward from an upper portion of the tray wall with a first hole defined in the tray flange. The cover has a ceiling with a ceiling periphery thereabout, a cover wall extending downward from the ceiling periphery and having a lower portion, a generally U-shaped portion extending at a first end thereof from the lower portion and having a second end opposite the first end and a middle portion between the first and second ends, and a cover flange extending outward from the second end of the generally U-shaped portion with a second hole defined in the cover flange. The cover is disposed atop the tray with the middle portion of the generally U-shaped portion disposed in contact with the tray flange and with the cover flange disposed a predetermined height above the tray flange with the first and second holes aligned with each other, such that the tray and cover enclose an interior for receiving the battery pack therein. The spacer has a third hole therethrough, wherein the spacer is disposed between the tray flange and the cover flange with the third hole aligned with the first and second holes. The elastomeric seal is disposed between the cover flange and the tray flange and between the generally U-shaped portion and the spacer. And the fastener arrangement has a shaft extending through the first, second and third holes and having opposed first and second shaft ends, a head formed on the first shaft end, a threaded portion on a second shaft end, and a nut engaged with the threaded portion.

In this embodiment, the elastomeric seal may form a first closed loop around the interior and the generally U-shaped portion may form a second closed loop around the interior, wherein the generally U-shaped portion being disposed in contact with the tray flange may provide a barrier which thermally isolates the elastomeric seal from the interior. The spacer may include a tubular body portion and a washer-like portion extending outward from an upper end of the tubular body portion, wherein the tubular body portion extends through the first hole and the washer-like portion is sandwiched between a top surface of the cover flange and an underside surface of the head. Additionally, the fastener arrangement may be configured to constrain a height between the cover flange and the tray flange so as to not exceed the predetermined height, and the spacer may be disposed so as to maintain the predetermined height between the cover flange and the tray flange.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
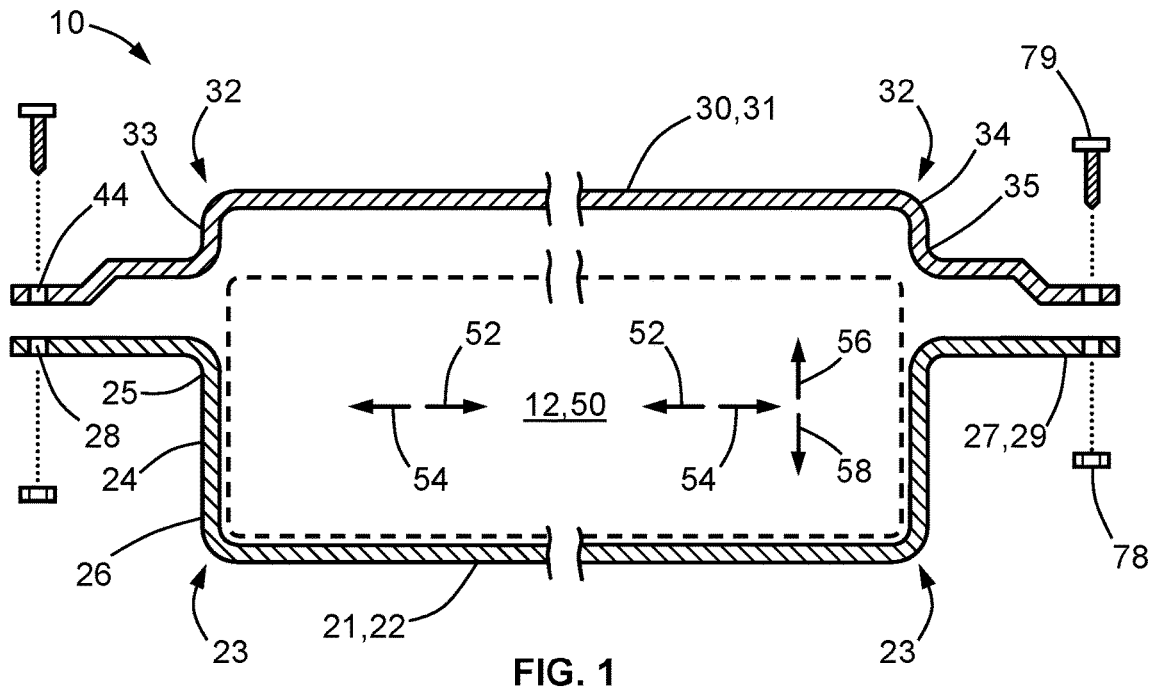
FIG. 1 is an exploded schematic cross-sectional side view of a customary tray and cover arrangement for a battery pack.

Referring now to the drawings, wherein like numerals indicate like parts in the several views, a fastening arrangement 20 is shown and described herein. Note that the fastening arrangement 20 may also be referred to herein as an improved alternative arrangement 20, a flange fastening and sealing arrangement 20, and/or as a housing 20 for thermal protection of a battery pack 12.

Figure 2:
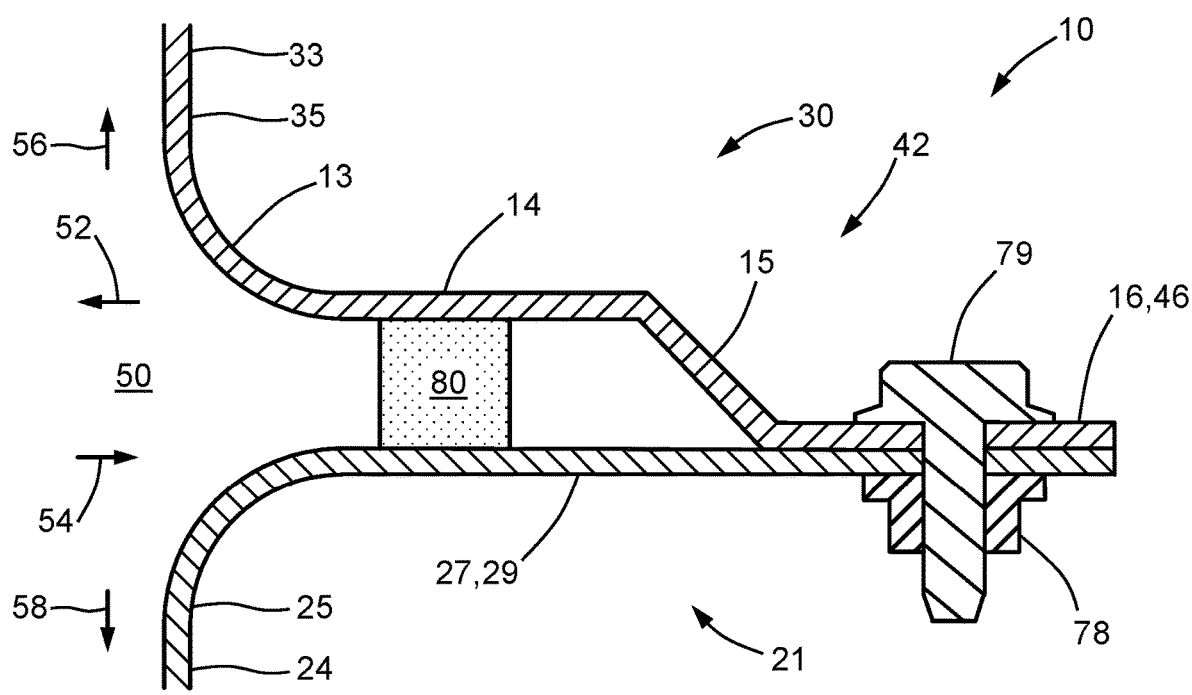
FIG. 2 is an assembled schematic cross-sectional side view of a portion of the customary tray and cover arrangement of FIG. 1.

FIG. 1 shows an exploded view of a customary tray and cover arrangement 10, such as may be used for a battery pack 12, and FIG. 2 shows a close-up assembled view of the right-hand side of the arrangement 10 shown in FIG. 1. In this customary arrangement 10, a cover 30 is disposed on top of a tray 21, thereby enclosing and defining an interior 50 or inner compartment configured to house a battery pack 12. The interior 50 serves to define an inward or interior direction 52 (e.g., any direction that points inward toward the interior 50 from outside the tray and cover arrangement 10), and an outward or exterior direction 54 that is opposite the inward or interior direction 52. Additionally, the cover 30 being disposed atop the tray 21 defines an upward or upper direction 56 (e.g., a direction pointing from the tray 21 to the cover 30), as well as a downward or lower direction 58 that is opposite the upward or upper direction 56 (e.g., a direction pointing from the cover 30 to the tray 21).

As shown in FIGS. 1-2, the cover 30 has a generally flat ceiling 31 which has a ceiling periphery 32 or outer boundary thereabout, with a cover wall 33 extending downward from the ceiling periphery 32 on all sides. The cover wall 33 has an upper portion 34 and a lower portion 35, with a cover flange 42 extending outward from the lower portion 35 of the cover wall 33. Similarly, the tray 21 has a floor 22 with a floor periphery 23 thereabout, and a tray wall 24 extending upward from the floor periphery 23 on all sides. The tray wall 24 has an upper portion 25 and a lower portion 26, with a tray flange 27 extending outward from the upper portion 25 of the tray wall 24. The tray flange 27 has a first hole 28 defined therein, and the cover flange 42 has a second hole 44 defined therein, such that the cover 30 may be disposed atop the tray 21 with the first and second holes 28, 44 aligned or registered with each other.

As illustrated in more detail in FIG. 2, the cover flange 42 may include a curved portion 13 extending downward and outward from the lower portion 35 of the cover wall 33, a first straight portion 14 extending outward from the curved portion 13, a downwardly extending portion 15 extending diagonally downward and outward from the first straight portion 14, and a second straight portion 16 extending outward from the downwardly extending portion 15. In this arrangement, only the second straight portion 16 of the cover flange 42 is in contact with the tray flange 27. Additionally, an elastomeric seal 80 is disposed between the first straight portion 14 of the cover flange 42 and the top surface of the tray flange 27, with the elastomeric seal 80 also being disposed inward of the downwardly extending portion 15 and outward of the interior 50. In most customary arrangements 10, the elastomeric seal 80 is adhered to the first straight portion 14 and to the tray flange 27 with an adhesive (not shown). Also included is a bolt 79 extending through the first and second holes 28, 44, with a head of the bolt 79 disposed against a top surface 46 of the second straight portion 16, and a nut 78 threaded onto the bolt 79 and disposed against a bottom surface 29 of the tray flange 27.

After a battery pack 12 (and/or other contents) has been placed into the tray 21, the customary arrangement 10 may be assembled by adhering the elastomeric seal 80 either to the tray flange 27 or to the cover flange 42, and then placing the cover 30 on top of the tray 21 such that the first and second holes 28, 44 in the flanges 27, 42 are aligned with each other. Then, a bolt 79 may be inserted through the aligned first and second holes 28, 44, and a nut 78 may be threaded onto the bolt 79, thereby clamping the flanges 27, 42 together. In this assembled state, the battery pack 12

(and/or other contents) is secured within the interior 50 formed by the cover 30 and tray 21.

In order to access or service the interior 50 after assembly, the nut 78 is loosened and removed from the bolt 79, and the bolt 79 is retracted from the first and second holes 28, 44. However, in many cases the elastomeric seal 80 is strongly adhered to the tray flange 27 and cover flange 42 surfaces, making it difficult or impossible to lift the cover 30 off of the tray 21 without excessive bending of the cover 30. Therefore, it is customary practice to pry apart the second straight portion 16 and the tray flange 27 enough to provide a small gap therebetween, and to insert a reciprocating saw blade into this gap, so that the reciprocating saw blade can cut through the elastomeric seal 80. However, this can be a laborious and time-consuming process, as the prying to form a gap and the sawing with the blade must proceed around most or all of the outer boundary of the tray/cover arrangement 10 in order to allow the cover 30 to be removed from the tray 21.

Figure 3:
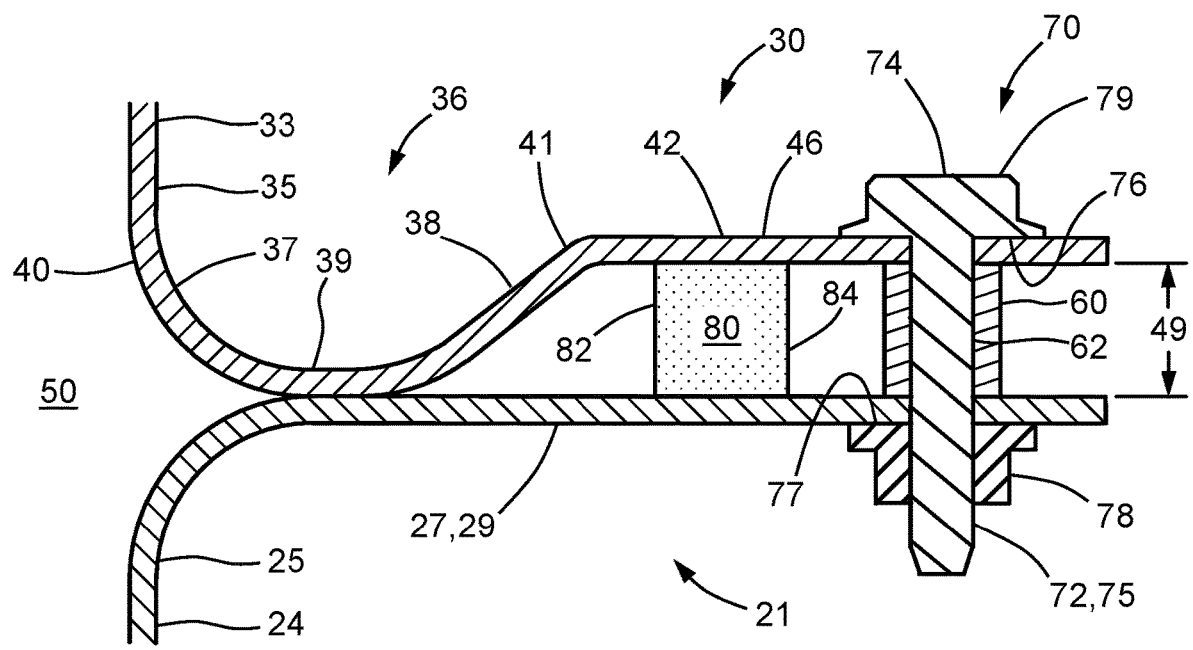
FIGS. 3-4 are schematic cross-sectional side views of first and second alternatives, respectively, of a fastening and sealing arrangement for a tray and cover according to the present disclosure.
Figure 4:
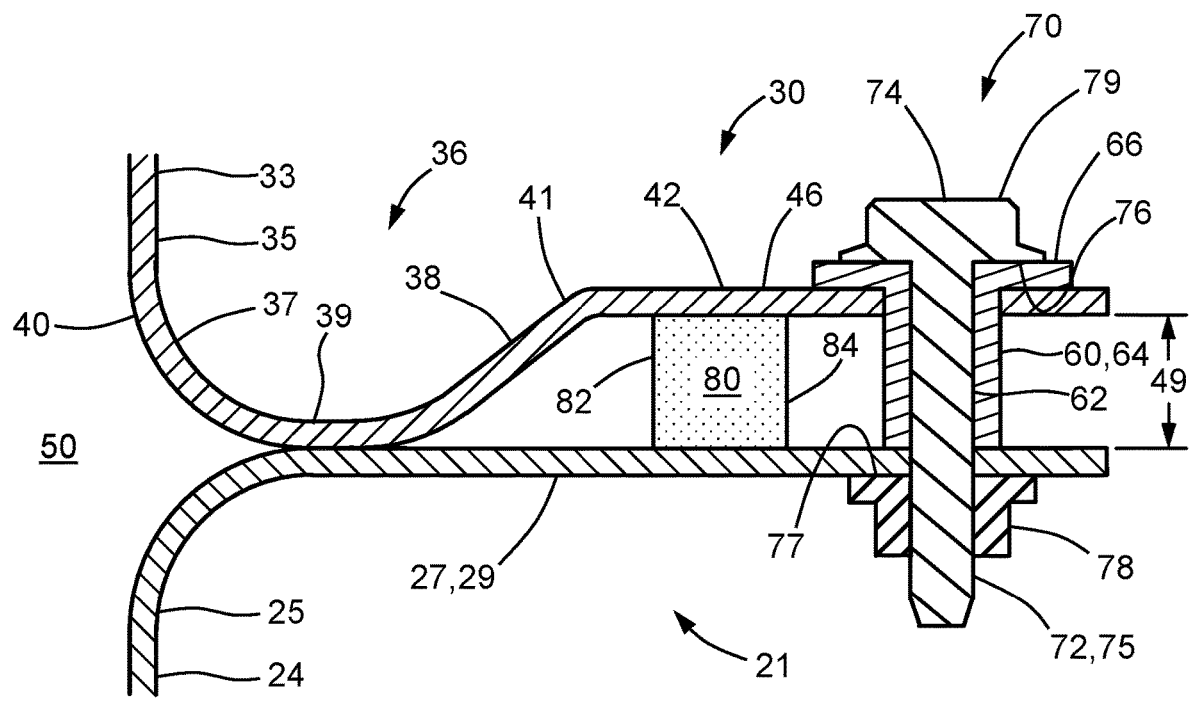
Figure 5:
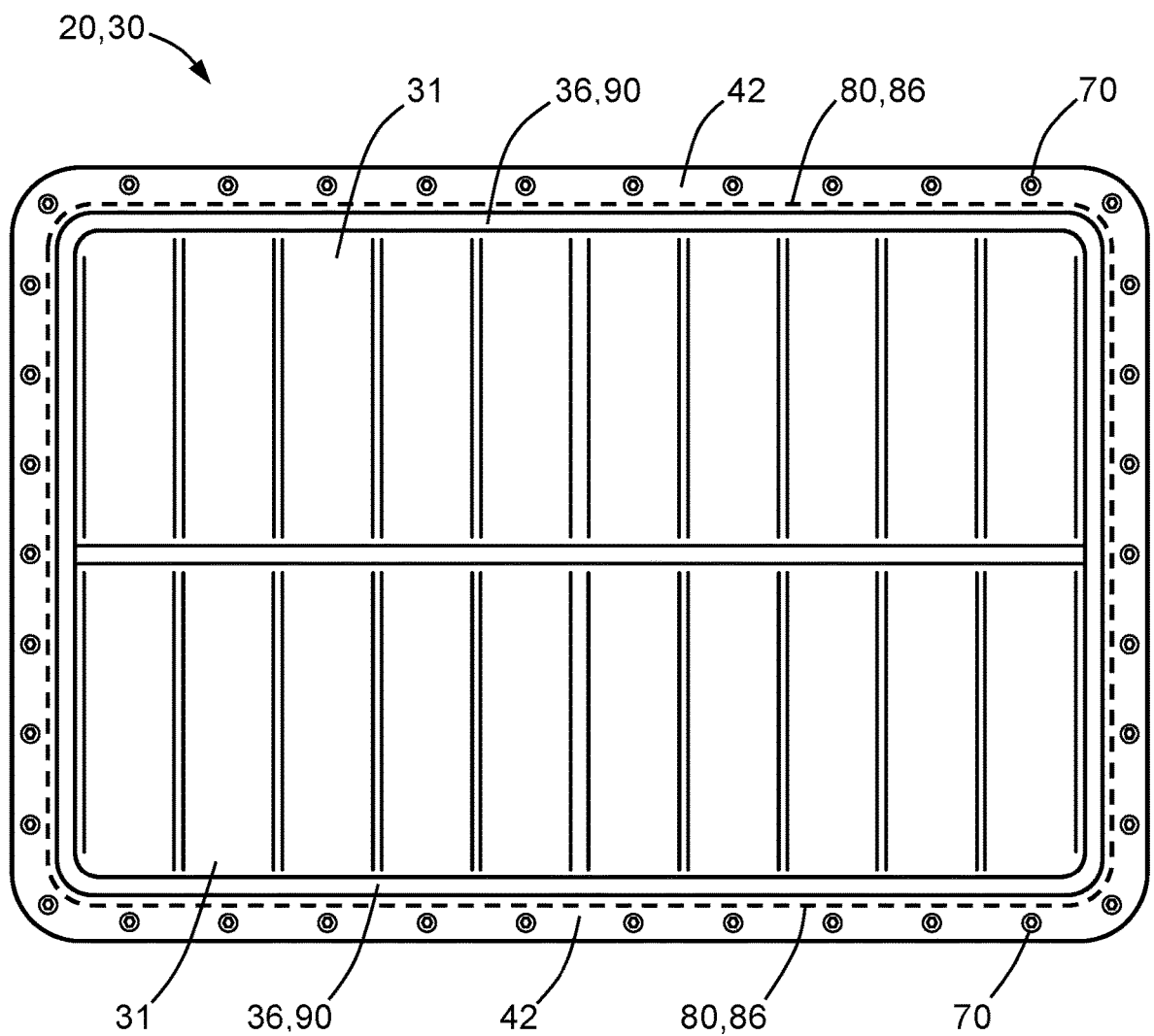
FIG. 5 is a schematic top view of a fastening and sealing arrangement for a tray and cover according to the present disclosure.

In contrast to the customary arrangement 10 shown in FIGS. 1-2, the present disclosure provides an improved alternative arrangement 20, as exemplified in FIGS. 3-5. This improved alternative arrangement 20 provides multiple technical advantages over customary arrangements 10 and approaches. First, a fastener arrangement 70 is provided, which maintains a predetermined amount of separation between the tray flange 27 and the cover flange 42 in the area immediately around the fastener arrangement 70. Second, the predetermined amount of separation between the flanges 27, 42 provides a way of easily accessing the elastomeric seal 80 from outside the housing 20, so that a reciprocating saw blade or other cutting device can cut through the elastomeric seal 80 much easier than the customary arrangement 10. Third, the shape of the cover flange 42 is very different from that of the customary arrangement 10, and is shaped so as to provide a barrier which thermally isolates and protects the elastomeric seal 80 from the interior 50 (where the battery pack 12 and/or other contents are housed).

According to one embodiment, the improved alternative fastening arrangement 20 includes a tray 21, a cover 30, a spacer 60 and a fastener arrangement 70. The tray 21 has a floor 22 with a floor periphery 23 thereabout, and a tray wall 24 extending upward from the floor periphery 23 on all sides. The tray wall 24 has an upper portion 25 and a lower portion 26, with a tray flange 27 extending outward from the upper portion 25 of the tray wall 24 with a first hole 28 defined in the tray flange 27.

The cover 30 has a ceiling 31 with a ceiling periphery 32 thereabout, and a cover wall 33 extending downward from the ceiling periphery 32 on all sides. The cover wall 33 has a lower portion 35, and a generally U-shaped portion 36 extending at a first end 40 thereof from the lower portion 35. The generally U-shaped portion 36 has a second end 41 opposite the first end 40, and a middle portion 39 between the first and second ends 40, 41. More specifically, the generally U-shaped portion 36 includes a first (or inner) generally upright portion 37 and a second (or outer) generally upright portion 38 on either side of the middle portion 39. The first and second generally upright portions 37, 38 and the middle portion 39 may each be straight or curved. Also, the middle portion 39 may be shaped as a single straight or curved segment, or it may be shaped as two or more contiguous straight or curved segments. The generally U-shaped portion 36 may have an overall "U" shape, an overall "V" shape, or an overall "W" shape. A cover flange 42 extends outward from the second end 41 of the generally U-shaped portion 36 with a second hole 44 defined in the cover flange 42. As shown in FIGS. 3-4, the cover 30 is disposed atop the tray 21 with the middle portion 39 of the generally U-shaped portion 36 disposed in contact with the tray flange 27, such that the tray 21 and cover 30 enclose an interior 50, and the cover flange 42 is disposed a predetermined height above the tray flange 27 with the first and second holes 28, 44 aligned or registered with each other.

The spacer 60 has a third hole 62 therethrough and is disposed between the tray flange 27 and the cover flange 42 with the third hole 62 aligned or registered with the first and second holes 28, 44. The spacer 60 may have a tubular body portion 64 with a circular or annular cross-section, or the tubular body portion 64 may assume other shapes, such as having a rectangular or hexagonal cross-section.

The fastener arrangement 70 has a shaft 72 extending through the first, second and third holes 28, 44, 62 and having opposed first and second (or top and bottom) shaft ends. A head 74 is formed on the first shaft end and a threaded portion 75 is formed on the second shaft end, and a nut 78 is engaged with the threaded portion 75. As illustrated in FIGS. 3-4, the fastener arrangement 70 may be oriented such that the head 74 is disposed above the threaded portion 75 and nut 78; or, this orientation may be inverted, with the threaded portion 75 and nut 78 disposed above the head 74. In either orientation, the fastener arrangement 70 may be configured to constrain a height 49 between the cover flange 42 and the tray flange 27 so as to not exceed the predetermined height. The head 74 may include a first clamping surface 76 (i.e., an underside surface of the head 74) which is seated directly or indirectly against a top surface 46 of the cover flange 42, and the nut 78 may include a second clamping surface 77 seated directly or indirectly against a bottom surface 29 of the tray flange 27. (As used here, a first or second clamping surface 76, 77 being "indirectly" seated against its associated top or bottom surface 46, 29 means that there is some other element or structure that is sandwiched between the clamping surface 76, 77 and its associated top or bottom surface 46, 29. For example, the other element or structure may be a washer, or a washer-like portion 66 of the spacer 60 as described below.)

The fastening arrangement 20 may further include an elastomeric seal 80 disposed between the cover flange 42 and the tray flange 27, and between the generally U-shaped portion 36 and the spacer 60. The seal 80 may have an interior-facing inner edge or surface 82, and an exterior-facing outer edge or surface 84. For example, the inner edge/surface 82 may face the second upright portion 38 of the generally U-shaped portion 36, and the outer edge/surface 84 may face the body 64 of the spacer 60. The elastomeric seal 80 may be adhered to both the cover flange 42 above and the tray flange 27 below, such as by an adhesive (not shown), and the seal 80 may be spaced apart or away from the spacer 60 (i.e., not disposed in contact with the spacer 60). As illustrated in the schematic top view of FIG. 5, where the elastomeric seal 80 is represented by the dashed lines, the elastomeric seal 80 may be disposed so as to form a first or inner closed loop 86 around the interior 50, and the generally U-shaped portion 36 may form a second or outer closed loop 90 around the interior 50, with the second closed loop 90 being outward of the first closed loop 86. As may be seen in FIGS. 3-5, the generally U-shaped portion 36 being disposed in contact with the top surface of the tray flange 27 provides a barrier which thermally isolates and protects the elastomeric seal 80 from the interior 50.

Turning to FIG. 4 in particular, the spacer 60 may include a washer-like portion 66 extending outward from an upper end of the tubular body portion 64. For example, the washer-like portion 66 may be shaped similar to a circular or annular washer, or it may assume other shapes (e.g., rectangular, hexagonal, etc.). Alternatively, the washer-like portion 66 may have the form of multiple tabs which radiate outward from a longitudinal axis of the third hole 62. As shown in FIG. 4, the tubular body portion 64 may extend through the first hole 28, and the washer-like portion 66 may be sandwiched between a top surface 46 of the cover flange 42 and an underside surface of the head 74. (Or, the tubular body portion 64 may extend through the second hole 44, with the washer-like portion 66 being sandwiched between a bottom surface 29 of the tray flange 27 and an upper or topside surface of the nut 78.) The spacer 60 may also be disposed so that the height 49 between the cover flange 42 and the tray flange 27 is maintained at a predetermined height.

It may be noted that the customary arrangement 10 of FIGS. 1-2 and the improved alternative arrangement 20 of FIGS. 3-5 share many similarities with each other. With this being the case, certain features of the improved alternative arrangement 20 may be discussed in the present written disclosure, but might not be shown explicitly in FIGS. 3-5; however, these features may be shown in FIGS. 1-2. For example, FIGS. 3-5 do not show the tray floor 22 or the floor periphery 23, nor do they show reference numerals for the ceiling periphery 32 or the upper portion 34 of the cover wall 33. In such cases, these features and reference numerals which are shown in FIGS. 1-2 but not in FIGS. 3-5 may be assumed as also applying to the improved alternative arrangement 20 as well.

Turning now to another embodiment of the improved alternative arrangement 20, a flange fastening and sealing arrangement 20 includes: (i) a tray 21 having a generally flat floor 22 with a floor periphery 23 thereabout, a tray wall 24 extending upward from the floor periphery 23, and a tray flange 27 extending outward from an upper portion 25 of the tray wall 24 with a first hole 28 defined in the tray flange 27; (ii) a cover 30 having a generally flat ceiling 31 with a ceiling periphery 32 thereabout, a cover wall 33 extending downward from the ceiling periphery 32 and having upper and lower portions 34, 35, a generally U-shaped portion 36 extending at a first end 40 thereof from the lower portion 35 and having a second end 41 opposite the first end 40 with a middle portion 39 between the first and second ends 40, 41, and a cover flange 42 extending outward from the second end 41 of the generally U-shaped portion 36 with a second hole 44 defined in the cover flange 42, wherein the cover 30 is disposed atop the tray 21 with the middle portion 39 of the generally U-shaped portion 36 disposed in contact with the tray flange 27 such that the tray 21 and cover 30 enclose an interior 50, and wherein the tray flange 27 and the cover flange 42 are disposed such that the first and second holes 28, 44 are aligned with each other; (iii) a spacer 60 having a third hole 62 therethrough, wherein the spacer 60 has a predetermined height and is disposed between the tray flange 27 and the cover flange 42 with the third hole 62 aligned with the first and second holes 28, 44; (iv) an elastomeric seal 80 disposed between the cover flange 42 and the tray flange 27 and between the generally U-shaped portion 36 and the spacer 60; and (v) a fastener arrangement 70 including a bolt 79 having a shaft 72 extending through the first, second and third holes 28, 44, 62, a head 74 formed on a first shaft end, a threaded portion 75 on a second shaft end, and a nut 78 engaged with the threaded portion 75.

In this embodiment, the elastomeric seal 80 may be adhered to both the cover flange 42 and the tray flange 27 and may be spaced apart from the spacer 60. The elastomeric seal 80 may form a first closed loop 86 around the interior 50, and the generally U-shaped portion 36 may form a second closed loop 90 around the interior 50. In this arrangement, the generally U-shaped portion 36 being disposed in contact with the tray flange 27 may provide a barrier which thermally isolates the elastomeric seal 80 from the interior 50. Additionally, the spacer 60 may include a tubular body portion 64 and a washer-like portion 66 extending outward from an upper end of the tubular body portion 64, wherein the tubular body portion 64 extends through the first hole 28 and the washer-like portion 66 is sandwiched between a top surface 46 of the cover flange 42 and an underside surface of the head 74.

According to yet another embodiment, a housing 20 for thermal protection of a battery pack 12 (and/or other contents) includes a tray 21, a cover 30, an elastomeric seal 80, a spacer 60 and a fastener arrangement 70. The tray 21 has a floor 22 with a floor periphery 23 thereabout, a tray wall 24 extending upward from the floor periphery 23, and a tray flange 27 extending outward from an upper portion 25 of the tray wall 24 with a first hole 28 defined in the tray flange 27. The cover 30 has a ceiling 31 with a ceiling periphery 32 thereabout, a cover wall 33 extending downward from the ceiling periphery 32 and having a lower portion 35, a generally U-shaped portion 36 extending at a first end 40 thereof from the lower portion 35 and having a second end 41 opposite the first end 40 and a middle portion 39 between the first and second ends 40, 41, and a cover flange 42 extending outward from the second end 41 of the generally U-shaped portion 36 with a second hole 44 defined in the cover flange 42. The cover 30 is disposed atop the tray 21 with the middle portion 39 of the generally U-shaped portion 36 disposed in contact with the tray flange 27 and with the cover flange 42 disposed a predetermined height above the tray flange 27 with the first and second holes 28, 44 aligned with each other, such that the tray 21 and cover 30 enclose an interior 50 for receiving the battery pack 12 (and/or other contents) therein. The spacer 60 has a third hole 62 therethrough, wherein the spacer 60 is disposed between the tray flange 27 and the cover flange 42 with the third hole 62 aligned with the first and second holes 28, 44. The elastomeric seal 80 is disposed between the cover flange 42 and the tray flange 27 and between the generally U-shaped portion 36 and the spacer 60. And the fastener arrangement 70 has a shaft 72 extending through the first, second and third holes 28, 44, 62 and having opposed first and second shaft ends, a head 74 formed on the first shaft end, a threaded portion 75 on a second shaft end, and a nut 78 engaged with the threaded portion 75.

In this embodiment, the elastomeric seal 80 may form a first closed loop 86 around the interior 50 and the generally U-shaped portion 36 may form a second closed loop 90 around the interior 50, wherein the generally U-shaped portion 36 being disposed in contact with the tray flange 27 provides a barrier which thermally isolates the elastomeric seal 80 from the interior 50. The spacer 60 may include a tubular body portion 64 and a washer-like portion 66 extending outward from an upper end of the tubular body portion 64, wherein the tubular body portion 64 extends through the first hole 28 and the washer-like portion 66 is sandwiched between a top surface 46 of the cover flange 42 and an underside surface of the head 74. Additionally, the fastener arrangement 70 may be configured to constrain a height 49 between the cover flange 42 and the tray flange 27 so as to not exceed the predetermined height, and the spacer 60 may be disposed so as to maintain the predetermined height between the cover flange 42 and the tray flange 27.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A fastening arrangement, comprising:
   a tray having a floor with a floor periphery thereabout, a tray wall extending upward from the floor periphery, and a tray flange extending outward from an upper portion of the tray wall with a first hole defined in the tray flange;
   a cover having a ceiling with a ceiling periphery thereabout, a cover wall extending downward from the ceiling periphery and having a lower portion, a generally U-shaped portion extending at a first end thereof from the lower portion and having a second end opposite the first end and a middle portion between the first and second ends, and a cover flange extending outward from the second end of the generally U-shaped portion with a second hole defined in the cover flange, wherein the cover is disposed atop the tray with the middle portion of the generally U-shaped portion disposed in contact with the tray flange such that the tray and cover enclose an interior and wherein the cover flange is disposed a predetermined height above the tray flange with the first and second holes aligned with each other;
   a spacer having a third hole therethrough, wherein the spacer is disposed between the tray flange and the cover flange with the third hole aligned with the first and second holes;
   an elastomeric seal disposed between the cover flange and the tray flange and between the generally U-shaped portion and the spacer, wherein the generally U-shaped portion being disposed in contact with the tray flange provides a barrier which thermally isolates the elastomeric seal from the interior; and
   a fastener arrangement having a shaft extending through the first, second and third holes and having opposed first and second shaft ends, a head formed on the first shaft end, a threaded portion on the second shaft end, and a nut engaged with the threaded portion.

2. The fastening arrangement of claim 1, wherein the fastener arrangement is configured to constrain a height between the cover flange and the tray flange so as to not exceed the predetermined height.

3. The fastening arrangement of claim 1, wherein the head includes a first clamping surface seated directly or indirectly against a top surface of the cover flange, and the nut includes a second clamping surface seated directly or indirectly against a bottom surface of the tray flange.

4. The fastening arrangement of claim 1, wherein the elastomeric seal is adhered to both the cover flange and the tray flange.

5. The fastening arrangement of claim 1, wherein the elastomeric seal is spaced apart from the spacer.

6. The fastening arrangement of claim 1, wherein the elastomeric seal forms a first closed loop around the interior.

7. The fastening arrangement of claim 6, wherein the generally U-shaped portion forms a second closed loop around the interior.

8. The fastening arrangement of claim 1, wherein the spacer includes a tubular body portion and a washer-like portion extending outward from an upper end of the tubular body portion, wherein the tubular body portion extends through the first hole and the washer-like portion is sandwiched between a top surface of the cover flange and an underside surface of the head.

9. The fastening arrangement of claim 1, wherein the spacer is disposed so as to maintain the predetermined height between the cover flange and the tray flange.

10. A flange fastening and sealing arrangement, comprising:
    a tray having a generally flat floor with a floor periphery thereabout, a tray wall extending upward from the floor periphery, and a tray flange extending outward from an upper portion of the tray wall with a first hole defined in the tray flange;
    a cover having a generally flat ceiling with a ceiling periphery thereabout, a cover wall extending downward from the ceiling periphery and having a lower portion, a generally U-shaped portion extending at a first end thereof from the lower portion and having a second end opposite the first end and a middle portion between the first and second ends, and a cover flange extending outward from the second end of the generally U-shaped portion with a second hole defined in the cover flange, wherein the cover is disposed atop the tray with the middle portion of the generally U-shaped portion disposed in contact with the tray flange such that the tray and cover enclose an interior, and wherein the tray flange and the cover flange are disposed such that the first and second holes are aligned with each other;
    a spacer having a third hole therethrough, wherein the spacer has a predetermined height and is disposed between the tray flange and the cover flange with the third hole aligned with the first and second holes;
    an elastomeric seal disposed between the cover flange and the tray flange and between the generally U-shaped portion and the spacer, wherein the generally U-shaped portion being disposed in contact with the tray flange provides a barrier which thermally isolates the elastomeric seal from the interior; and a fastener arrangement including a bolt having a shaft extending through the first, second and third holes and having opposed first and second shaft ends, a head formed on the first shaft end, a threaded portion on the second shaft end, and a nut engaged with the threaded portion.

11. The flange fastening and sealing arrangement of claim 10, wherein the elastomeric seal is adhered to both the cover flange and the tray flange and is spaced apart from the spacer.

12. The flange fastening and sealing arrangement of claim 10, wherein the elastomeric seal forms a first closed loop around the interior and the generally U-shaped portion forms a second closed loop around the interior.

13. The flange fastening and sealing arrangement of claim 10, wherein the spacer includes a tubular body portion and a washer-like portion extending outward from an upper end of the tubular body portion, wherein the tubular body portion extends through the first hole and the washer-like portion is sandwiched between a top surface of the cover flange and an underside surface of the head.

14. A housing for thermal protection of a battery pack, comprising:

a tray having a floor with a floor periphery thereabout, a tray wall extending upward from the floor periphery, and a tray flange extending outward from an upper portion of the tray wall with a first hole defined in the tray flange;

a cover having a ceiling with a ceiling periphery thereabout, a cover wall extending downward from the ceiling periphery and having a lower portion, a generally U-shaped portion extending at a first end thereof from the lower portion and having a second end opposite the first end and a middle portion between the first and second ends, and a cover flange extending outward from the second end of the generally U-shaped portion with a second hole defined in the cover flange;

wherein the cover is disposed atop the tray with the middle portion of the generally U-shaped portion disposed in contact with the tray flange and with the cover flange disposed a predetermined height above the tray flange with the first and second holes aligned with each other, such that the tray and cover enclose an interior for receiving the battery pack therein;

a spacer having a third hole therethrough, wherein the spacer is disposed between the tray flange and the cover flange with the third hole aligned with the first and second holes;

an elastomeric seal disposed between the cover flange and the tray flange and between the generally U-shaped portion and the spacer, wherein the generally U-shaped portion being disposed in contact with the tray flange provides a barrier which thermally isolates the elastomeric seal from the interior; and a fastener arrangement having a shaft extending through the first, second and third holes and having opposed first and second shaft ends, a head formed on the first shaft end, a threaded portion on the second shaft end, and a nut engaged with the threaded portion.

15. The housing of claim 14, wherein the elastomeric seal forms a first closed loop around the interior and the generally U-shaped portion forms a second closed loop around the interior.

16. The housing of claim 14, wherein the spacer includes a tubular body portion and a washer-like portion extending outward from an upper end of the tubular body portion, wherein the tubular body portion extends through the first hole and the washer-like portion is sandwiched between a top surface of the cover flange and an underside surface of the head.

17. The housing of claim 14, wherein the fastener arrangement is configured to constrain a height between the cover flange and the tray flange so as to not exceed the predetermined height, and wherein the spacer is disposed so as to maintain the predetermined height between the cover flange and the tray flange.

* * * * *